US007330923B2

United States Patent
Wenstrand et al.

(10) Patent No.: US 7,330,923 B2
(45) Date of Patent: Feb. 12, 2008

(54) INPUT DEVICES AND METHODS OF OPERATING SAME

(75) Inventors: John S. Wenstrand, Menlo Park, CA (US); George Panotopoulos, Palo Alto, CA (US); Akihiro Machida, Sunnyvale, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 135 days.

(21) Appl. No.: 11/085,438

(22) Filed: Mar. 21, 2005

(65) Prior Publication Data

US 2006/0212635 A1    Sep. 21, 2006

(51) Int. Cl.
*G06F 13/00*    (2006.01)
*G09G 5/08*    (2006.01)

(52) U.S. Cl. ............... 710/303; 345/156; 345/163; 345/164; 345/167; 361/685; 710/304

(58) Field of Classification Search ........ 345/156–184; 361/686
See application file for complete search history.

(56) References Cited

U.S. PATENT DOCUMENTS

| | | | |
|---|---|---|---|
| 5,126,955 A | | 6/1992 | Tomoda |
| 5,428,355 A | | 6/1995 | Jondrow et al. |
| 5,490,039 A | | 2/1996 | Helms |
| 5,689,654 A | * | 11/1997 | Kikinis et al. ............ 710/303 |
| 5,726,684 A | | 3/1998 | Blankenship et al. |
| 5,999,799 A | * | 12/1999 | Hu et al. .................. 455/67.7 |
| 6,035,350 A | * | 3/2000 | Swamy et al. ............... 710/73 |
| 6,166,722 A | * | 12/2000 | Kawabe et al. ............ 345/169 |
| 6,205,021 B1 | | 3/2001 | Klein et al. |
| 6,219,037 B1 | | 4/2001 | Lee |
| 6,290,136 B1 | * | 9/2001 | Koseki et al. ............... 235/475 |
| 6,304,249 B1 | * | 10/2001 | Derocher et al. ........... 345/163 |
| 6,424,335 B1 | * | 7/2002 | Kim et al. ................... 345/158 |
| 6,476,795 B1 | * | 11/2002 | Derocher et al. ........... 345/163 |
| 6,590,563 B1 | * | 7/2003 | Oross et al. ................. 345/163 |
| 6,633,155 B1 | | 10/2003 | Liang |
| 6,665,741 B1 | * | 12/2003 | Bronson ........................ 710/8 |
| 6,690,352 B2 | * | 2/2004 | Cheng et al. ................ 345/156 |

(Continued)

OTHER PUBLICATIONS

MoGo Mouse X54 Pro—retrieved from: http://www.newtonperipherals.com/mogo_mouseX54pro.html—retrieved on Sep. 6, 2007—2 pages.*

*Primary Examiner*—Mark H. Rinehart
*Assistant Examiner*—Brian Misiura (57) ABSTRACT

Input devices and methods of operating the same are described. In one aspect, an apparatus includes a housing, a display screen, a main input device, a wireless receiver, a carrier bay, and an auxiliary input device. The main input device translates user manipulations of the main input device into control signals. The auxiliary input device is sized and arranged to be carried in and attached to the carrier bay in a docked state and detached from the carrier bay in an undocked state. In the undocked state, the auxiliary input device translates user manipulations of the auxiliary input device into control signals and wirelessly transmits the control signals for reception by the wireless receiver. In the docked state, the auxiliary input device is unresponsive to user manipulations of the auxiliary input device. The apparatus additionally includes a graphics controller in the housing that presents a graphical user interface on the display screen in accordance with the control signals received by the wireless receiver from the main input device and the auxiliary input device.

3 Claims, 5 Drawing Sheets

U.S. PATENT DOCUMENTS

| | | | |
|---|---|---|---|
| 6,784,870 B2 * | 8/2004 | Yin | 345/156 |
| 6,882,334 B1 * | 4/2005 | Meyer | 345/156 |
| 6,940,487 B2 * | 9/2005 | Matsunaga | 345/156 |
| 6,970,156 B1 * | 11/2005 | Silverstein | 345/163 |
| 7,050,291 B2 * | 5/2006 | Narendra et al. | 361/502 |
| 2002/0163777 A1 * | 11/2002 | Yu et al. | 361/683 |
| 2004/0017358 A1 | 1/2004 | Kuo | |
| 2004/0123001 A1 | 6/2004 | Kikuchi et al. | |
| 2004/0145565 A1 | 7/2004 | Yang | |
| 2005/0001819 A1 * | 1/2005 | DePue et al. | 345/166 |
| 2006/0022943 A1 * | 2/2006 | Johnson et al. | 345/157 |
| 2006/0023410 A1 * | 2/2006 | Solomon et al. | 361/683 |
| 2006/0023415 A1 * | 2/2006 | Rankins et al. | 361/685 |
| 2006/0082553 A1 * | 4/2006 | Lin | 345/163 |
| 2006/0087494 A1 * | 4/2006 | Yatsu | 345/159 |
| 2006/0176277 A1 * | 8/2006 | Daniel et al. | 345/163 |

* cited by examiner

INPUT DEVICES AND METHODS OF OPERATING SAME

BACKGROUND

Many different types of input devices have been developed for inputting commands into a machine. For example, hand-manipulated input devices, such computer mice, joysticks, trackballs, touchpads, and keyboards, commonly are used to input instructions into a computer by manipulating the interface device. Such input devices allow a user to control movement of a virtual pointer, such as a cursor, across a computer screen, select or move an icon or other virtual object displayed on the computer screen, and open and close menu items corresponding to different input commands.

Input devices commonly are used in both desktop computer systems and portable computing systems. As used herein, the term "portable computer system" broadly refers to any data processing system that is small enough to be carried easily by a user, including a laptop computer, a notebook computer, a sub-notebook computer, a hand-held computer, a palmtop computer, a pocket computer, and a notepad computer. A portable computer system typically operates under battery power and typically includes a self-contained portable computer system unit that includes a processor, memory, a video display and at least one input device.

Input devices for desktop computer systems typically have fewer and more flexible design constraints than inputs devices for portable computer systems because of the greater space and power resources that are available to desktop computer systems. Although desktop computer input devices typically may be connected to portable computer systems, the larger size and power requirements of such input devices, as well as the consequential need to carry these extra input devices and connectors, makes their use with portable computer systems less desirable.

A wide variety of different types of input devices have been developed to attempt to adapt the comforts and convenience associated with desktop computer input devices to the realities of mobile computing environments. For example, some laptop and notebook computers include two different types of input devices to give users multiple interface options. These types of input devices, however, are fixed to the portable computer system housings, preventing users from manipulating these input devices in different and perhaps more ergonomic ways when additional space is available.

Some other portable computer systems include single-function or dual-function input devices that are detachable from the main portable computer system housing, enabling users to position and manipulate these input devices with greater freedom and flexibility. These detachable input devices may communicate with the main portable computer system through a wired or wireless communication channel. In one particular approach, a detachable input device for a portable computer system includes as input module, which may be in the form of a touch pad, a trackball, or a track stick, and a wireless optical mouse sensor module. In this approach, when attached to the portable computer system, the input module of the input device is operational, but the wireless mouse functions are inactive. When detached from the portable computer system, the wireless mouse functions of the input device are operational, but the input module is inactive.

Hitherto, detachable input devices for portable computer systems have been designed as primary input devices. Some detachable input devices have the same sizes as their desktop counterparts, but these devices tend to be relatively bulky when used in the detached operational mode. Other detachable input devices are sized for ease of use in the detached operational mode, but these devices tend to be relatively small and difficult to use on a continuous basis. In addition, unless these detachable input devices are attached to the portable computer system housing by a wired connection, there is a substantial risk that they will become lost, in which case the user would not be able to input commands into the portable computer system until another input device is obtained.

SUMMARY

In one aspect, the invention features an apparatus that includes a housing, a display screen coupled to the housing, a wireless receiver in the housing, and a carrier bay defined by the housing. The apparatus also includes a main input device and an auxiliary input device. The main input device is operable to translate user manipulations of the main input device into control signals. The auxiliary input device is sized and arranged to be carried in and attached to the carrier bay in a docked state and detached from the carrier bay in an undocked state. In the undocked state, the auxiliary input device translates user manipulations of the auxiliary input device into control signals and wirelessly transmits the control signals for reception by the wireless receiver. In the docked state, the auxiliary input device is unresponsive to user manipulations of the auxiliary input device. The apparatus additionally includes a graphics controller in the housing that is operable to present a graphical user interface on the display screen in accordance with the control signals received from the main input device and the auxiliary input device.

In another aspect, the invention features an apparatus that includes a housing, a wireless receiver in the housing, a carrier bay defined by the housing and comprising a docking interface, and an input device that is sized and arranged to be carried in and attached to the carrier bay in a docked state and detached from the carrier bay in an undocked state. In the undocked state, the input device translates user manipulations of the input device into control signals and wirelessly transmits the control signals for reception by the wireless receiver.

The input device includes a docking interface with charging terminals mating with the docking interface of the carrier bay, and a capacitor that is electrically connected across the charging terminals of the input device and is operable to store charge that supplies power to energizable components of the input device.

The apparatus additionally includes a power supply charger that is electrically coupled to the docking interface of the carrier bay. The power supply charger is operable to charge the capacitor through the docking interfaces of the carrier bay and the input device when the input device is in the docked state.

The invention also features a machine-implemented method, in accordance with which a docking state of an input device with respect to a carrier bay of portable computer system is determined. The existence of a predetermined risk factor for losing the input device is determined. In response to a determination that the input device is in an undocked state and that the predetermined risk factor is present, an alarm-triggering control signal is generated.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

The embodiments that are described in detail below provide user-friendly input devices that conveniently may be used in small spaces, such as those spaces that typically are available in mobile computing environments. Some of these embodiments include a primary input device and an auxiliary input device that is operational only in an undocked state. In some embodiments, the input devices include fast-charging rechargeable power supplies that are designed to minimize power requirements while accommodating practical mobile computing usage requirements.

Figure 1:
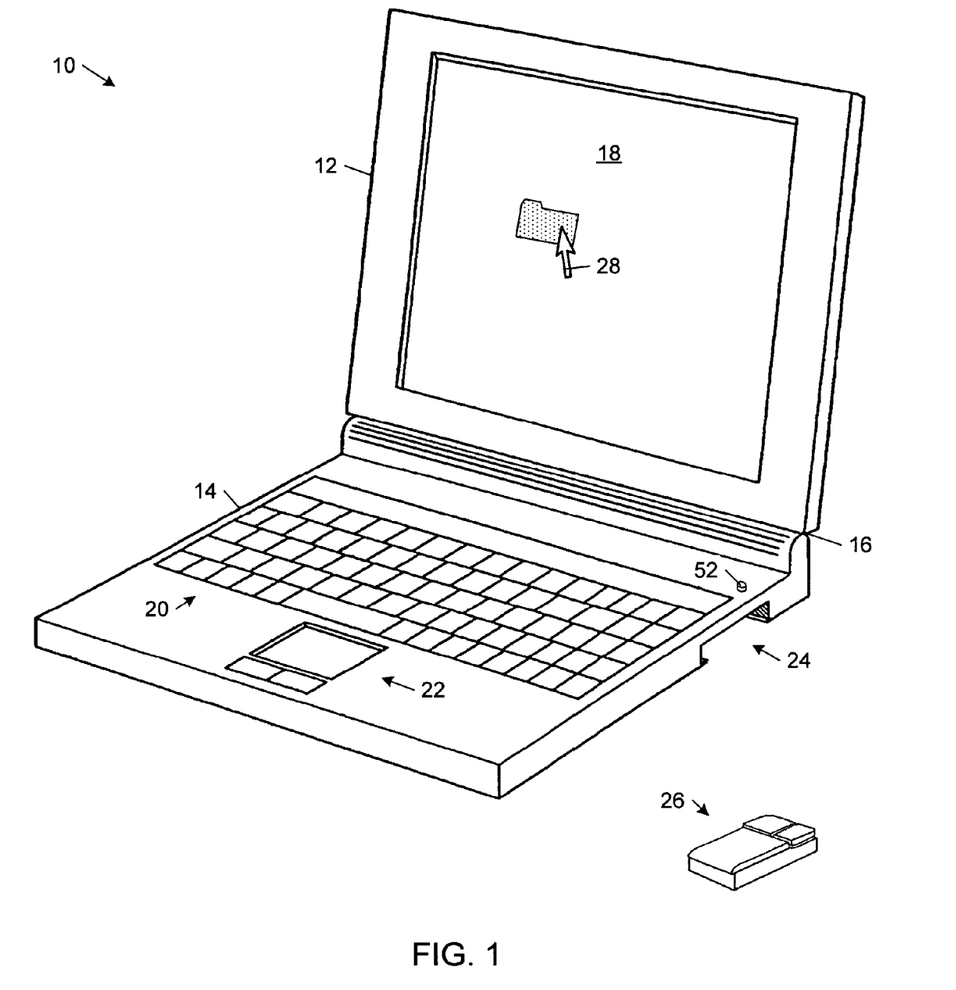
FIG. 1 a perspective view of an embodiment of a portable computer system that includes a main input device and an auxiliary input device.

FIG. 1 shows an embodiment of a portable computer system 10 that includes a cover 12 that is attached to a base 14 by a hinge 16. The exteriors of the cover 12 and the base 14 collectively form a housing of the portable computer system 10. The cover 12 typically is in the open position shown in FIG. 1 when the portable computer system 10 is in use and typically is closed and latched to the base 14 when the portable computer system 10 is not in use. In the illustrated embodiment, the portable computer system 10 is a laptop computer. In general, however, the portable computer system 10 may be implemented in the form of any one of a wide variety of conventional computer systems that are small enough to be carried by a user, including a laptop computer, a notebook computer, a sub-notebook computer, a hand-held computer, a palmtop computer, a pocket computer, and a notepad computer.

The cover 12 includes a display screen 18, which may be a flat panel display, such as a LCD (liquid crystal display), a plasma display, an EL display (electro-luminescent display) and a FED (field emission display). The base includes a keyboard 20, a main input device 22, and a carrier bay 24. An auxiliary input device 26 is sized and arranged to be carried in and attached to the carrier bay 24 in a docked state and detached from the carrier bay 24 in an undocked state. The main input device 22 and the auxiliary input device 26 both translate user manipulations into signals for inputting commands into the portable computer system 10, including control signals for moving a pointer 28 across the display screen 18. The main input device 22 and the auxiliary input device 26 may be any type of input device. Each of the main input device 22 and the auxiliary input device 26 includes one or more sensors that are capable of sensing user manipulations of a the auxiliary input device 26, including user manipulations of a component of the auxiliary input device 26 (e.g., a touch pad, a trackball, or a joystick) or manipulations of the auxiliary input device 26 itself (e.g., movement of the auxiliary input device 26 across a surface or through the air). In some implementations, the auxiliary input device 26 is responsive to user manipulations only in the undocked state; in the docked state, the auxiliary input device 26 is unresponsive to user manipulations. In these implementations, the main input device 22 is responsive to user manipulations during all periods when the portable computer system 10 is operational.

Figure 2:
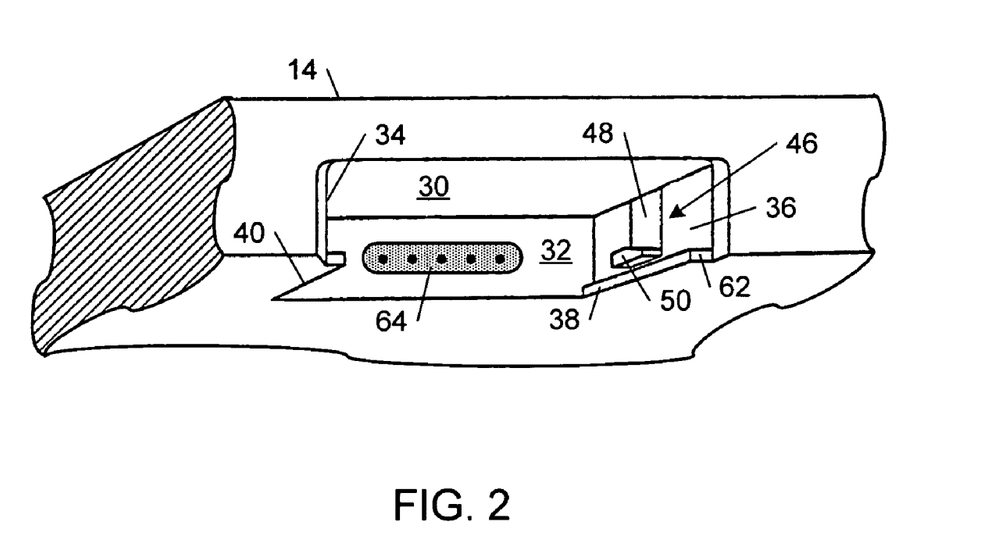
FIG. 2 is a perspective view of a portion of the portable computer system of FIG. 1 that includes a carrier bay.
Figure 3:
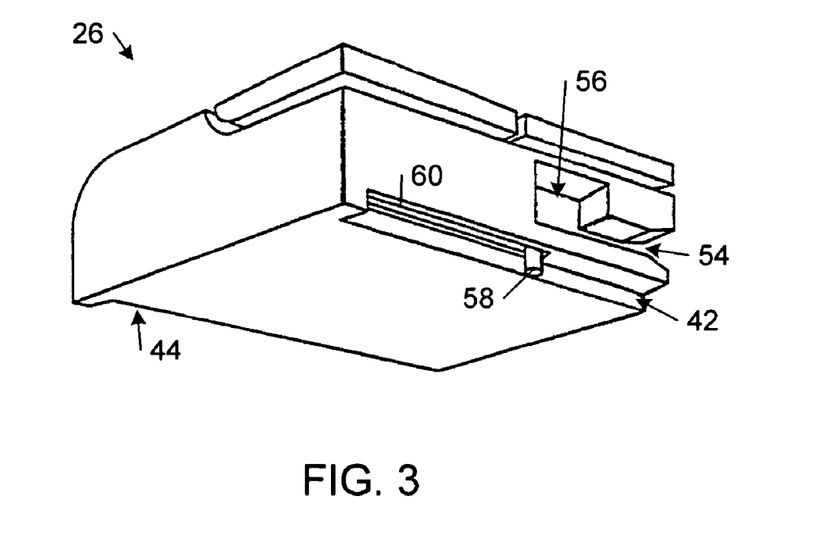
FIG. 3 shows a perspective view of an embodiment of the auxiliary input device shown in FIG. 1.

Referring to FIGS. 2 and 3, in some implementations, the carrier bay 24 includes top, side, front and rear sidewalls 30, 32, 34, 36 that define a recess for housing the auxiliary input device 26. The carrier bay 24 also includes a pair of guide rails 38, 40 that mate with a pair of matching notches 42, 44 that are formed in the body of the auxiliary input device 26. A latch 46 in the carrier bay 24 includes a spring-loaded arm 48 and a catch 50. The arm 48 is connected to a release button 52 on the top of the base 14 of the portable computer system 10 (see FIG. 1). The catch 50 is sized and arranged to slide through a slot 54 in the body of the auxiliary input device 26 when the auxiliary input device 26 is being moved into and out of the carrier bay 24. The catch 50 also is sized and arranged to slide within a notch 56 in the body of the auxiliary input device 26 when the auxiliary input device 26 is in the docked state. The auxiliary input device 26 also includes a spring-loaded nib 58 that slides within a slot 60. When the auxiliary input device 26 is loaded into the carrier bay 24, the nib 58 catches on a side edge 62 of the guide rail 38 and provides a positive bias urging the ejection of the auxiliary input device 26 out of the carrier bay 24. The carrier bay 24 additionally includes an electrical docking interface 64 that mates with a corresponding electrical docking interface (94; shown in FIG. 6) on the body of the auxiliary input device 26.

In operation, the guide rails 38, 40 guide movement of the auxiliary input device 26 into and out of the carrier bay 24. In the illustrated embodiment, the carrier bay 24 and the auxiliary input device 26 are constructed and arranged so that when the base 14 and the auxiliary input device 26 are on a planar surface (e.g., a table top) the auxiliary input device 26 is slidable into and out of the carrier bay 24 while maintaining contact with the planar surface. As the auxiliary input device 26 is being inserted into the carrier bay 24, the nib 58 catches the side edge 62 of the guide rail 38 and moves along the slot 60; a spring within the auxiliary input device 26 resists this movement of the nib along the slot 60. At the same time, the catch 50 slides within the slot 54 in the body of the auxiliary input device 26. When the auxiliary input device 26 is inserted fully within the carrier bay 24, a spring (not shown) that is coupled to the arm 48 of the latch 46 pulls the catch 50 upward into the notch 56. Contact between the catch 50 and the upper wall of the notch 56 produces a clicking sound, which provides the user with an audible indication that the auxiliary input device is properly docked within the carrier bay 24. In the illustrated embodiment, the body of the auxiliary input device 26 substantially closes the side and bottom openings of the carrier bay 24 when the auxiliary input device 26 is in the docked state.

To release the auxiliary input device 26 from the carrier bay 24, a user simply depresses the release button 52, which causes the catch 50 to slide down to the bottom of the notch 56 and allows the catch 50 to slide through the slot 54. The positive ejection force provided by the spring-loaded nib 58 against the side edge 62 of the guide rail 38 ejects the auxiliary input device 26 from the carrier bay 24.

Figure 4:
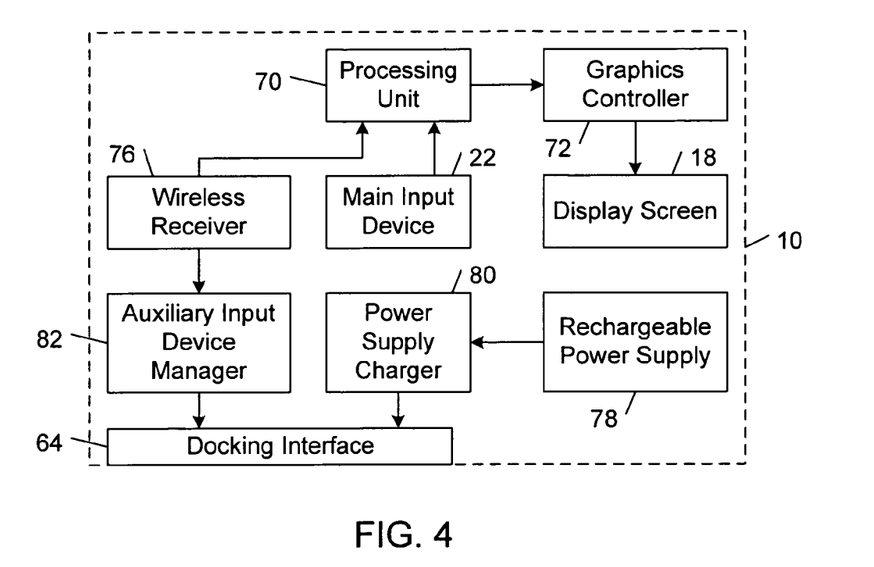
FIG. 4 is a block diagram of components of an implementation of the portable computer system of FIG. 1.

Referring to FIG. 4, the portable computer system 10 includes a processing unit 70, a graphics controller 72, a wireless receiver 76, a rechargeable power supply 78, a power supply charger 80, and an auxiliary input device manager 82. The processing unit 70 may include one or more processors, each of which may be in the form of any one of various commercially available processors. The graphics controller 72 converts display output signals received from processing unit 18 into display control signals for controlling the presentation of graphical elements, including the elements of a graphical user interface, on the display screen 18.

The wireless receiver 76 receives control signals that are transmitted by the auxiliary input device 26 over one or more wireless communication channels. The wireless receiver 76 may be implemented by any one of a wide variety of different wireless receivers, including a radio-frequency (RF) receiver and an infrared (IR) receiver. The main input device 22 and the wireless receiver 76 transmit their respective output control signals to the processing unit 70 for processing.

The rechargeable power supply 78 may be any type of battery or other electrical power store that can be recharged by an external power source (e.g., an AC power adapter that is connected to AC utility power). The power supply charger 80 connects the rechargeable power supply 78 to the docking interface 64 and thereby controls the power that is delivered to the auxiliary input device 26 when it is docked in the carrier bay 24. In some implementations, the power supply charger 80 may charge the auxiliary input device 26 in accordance with one or more power management protocols (e.g., only charge the auxiliary input device 26 when the power level of the rechargeable power supply 78 is above a threshold power level).

The auxiliary input device manager 82 is electrically connected to the docking interface 64 and the wireless receiver 76. In some implementations, the auxiliary input device manager 82 is designed to assist the user in maintaining physical possession of the auxiliary input device 26. In these implementations, the auxiliary input device manager 82 executes various tracking tests to determine when to trigger an alarm alerting the user to the risk of losing the auxiliary input device 26 based on signals received from the docking interface 64 and the wireless receiver 76.

Figure 5:
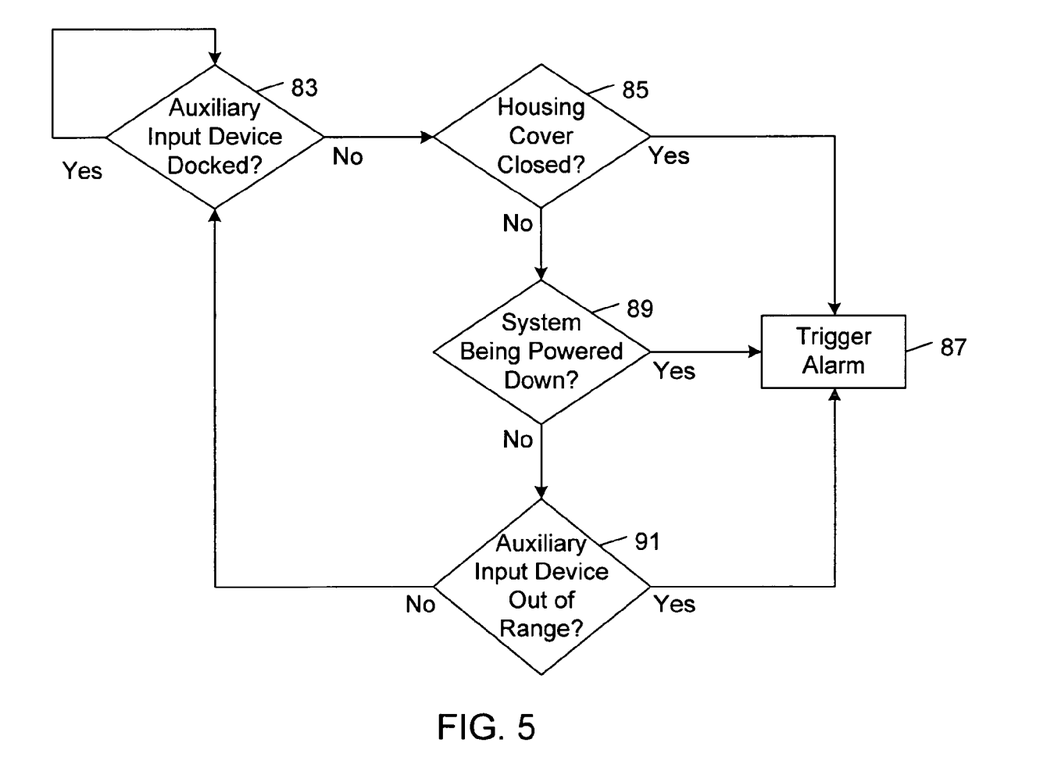
FIG. 5 is a flow diagram of an embodiment of a method of managing the auxiliary input device of FIG. 1.

FIG. 5 shows an embodiment of a method by which auxiliary input device manager 82 determines when to trigger an alarm alerting the user to the risk of losing the auxiliary input device 26. The auxiliary input device manager 82 determines if the auxiliary input device 26 is docked (block 83). The auxiliary input device manager 82 may determine if the auxiliary input device 26 is docked, for example, by detecting whether the ground of the auxiliary input device docking interface 94 is connected to the corresponding ground connection of the portable computer system docking interface 64. If the auxiliary input device 26 is not docked (block 83), the auxiliary input device 26 determines whether one or more risk factors for losing the auxiliary input device 26 is present. In the illustrated embodiment, the auxiliary input device manager 82 determines if the housing cover 12 is closed (block 85). Typically, closing the cover 12 operates a switch that generates a signal that is detectable by the auxiliary input device manger 82. If the housing cover 12 is closed, the auxiliary input device manager 82 triggers an alarm alerting the user to the risk of losing the auxiliary input device 26 (block 87). In some implementations, the alarm is a distinctive audible sound (e.g., a beep) that is recognizable by the user as an alarm.

If the housing cover 12 is not closed (block 83), the auxiliary input device manager 82 determines if the portable computer system 10 is being powered down (e.g., into a sleep mode or a full shutdown mode (block 89). In some implementations, a user's command to power down the portable computer system 10 triggers the generation of a signal that is detectable by the auxiliary input device manger 82. If the portable computer system 10 is being powered down, the auxiliary input device manager 82 triggers the alarm (block 87). The alarm may be an audible alarm or a warning notice displayed on the display screen 18, such that if the user is not present or otherwise able to hear an audible alarm, the user will receive notice through this visible alert.

If the housing cover is not closed and the system is not being powered down (blocks 83, 89), the auxiliary input device manager 82 determines if the auxiliary input device 26 is out of range (block 91). In some implementations, the auxiliary input device manager 82 infers that the auxiliary input device 26 is out of range of the portable computer system 10 if the signals received by the wireless receiver 76 from the auxiliary input device 26 are below a threshold power level. If the auxiliary input device 26 is out of range, the auxiliary input device manager 82 triggers the alarm (block 87). The alarm may be an audible alarm or a warning notice displayed on the display screen 18, such that if the user is not present or otherwise able to hear an audible alarm, the user will receive notice through this visible alert.

In addition to the above-described components, the portable computer system 10 may include other components (not shown), such as a system memory and a system bus. The system memory typically includes a read only memory (ROM) that stores a basic input/output system (BIOS) that contains start-up routines for portable computer system 10, and a random access memory (RAM). Portable computer system 10 also may include a hard drive, a floppy drive, and CD ROM drive that are connected to the system bus by respective interfaces. The hard drive, floppy drive, and CD ROM drive contain respective computer-readable media disks that provide non-volatile or persistent storage for data, data structures and computer-executable instructions. Other computer-readable storage devices (e.g., magnetic tape drives, flash memory devices, and digital video disks) also may be used with portable computer system 10.

Figure 6:
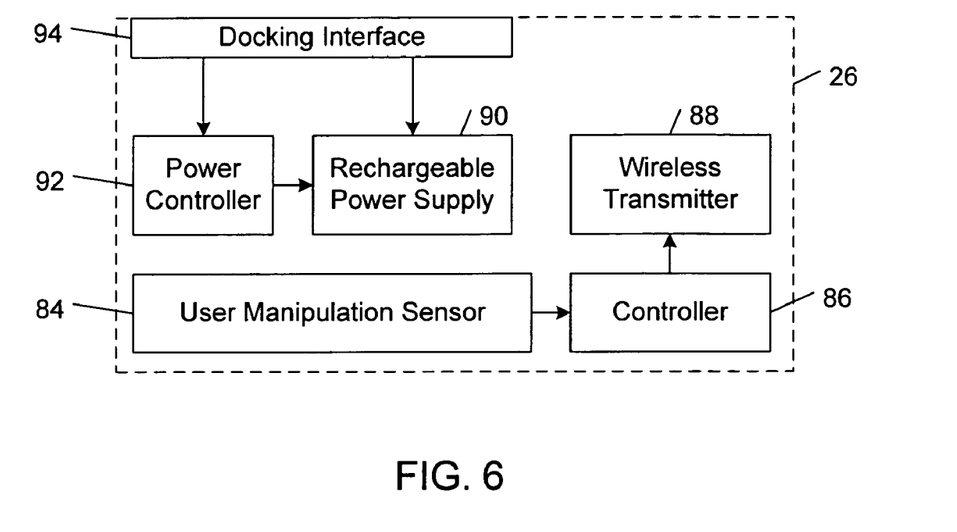
FIG. 6 is a block diagram of components of an implementation of the auxiliary input device of FIG. 1.

FIG. 6 shows an embodiment of the auxiliary input device 26 that includes a user manipulation sensor 84, which may be any type of sensor (e.g., an optical sensor, or an inertial sensor) that is capable of sensing user manipulations of the auxiliary input device 26, including user manipulations of a component of the auxiliary input device 26 (e.g., a touch pad, a trackball, or a joystick) and manipulations of the auxiliary input device 26 itself (e.g., movement of the auxiliary input device across a surface or through the air).

In some embodiments, the user manipulation sensor 84 corresponds to an optical navigation sensor module that includes an imager and a movement detector. The imager may be any form of imaging device that is capable of capturing one-dimensional or two-dimensional images of a reference surface. The imager includes at least one image sensor. Exemplary image sensors include one-dimensional and two-dimensional CMOS (Complimentary Metal-Oxide Semiconductor) image sensors and CCD (Charge-Coupled Device) image sensors. The imager captures images at a rate (e.g., 1500 pictures or frames per second) that is fast enough so that sequential pictures of the reference surface 14 overlap. The imager may include one or more optical elements that focus light reflecting from the reference surface onto the one or more image sensors. In some embodiments, a light source (e.g., a light-emitting diode array) illuminates the reference surface to increase the contrast in the image data that is captured by the imager.

The movement detector is not limited to any particular hardware or software configuration, but rather it may be implemented in any computing or processing environment, including in digital electronic circuitry or in computer hardware, firmware, or software. In one implementation, the movement detector includes a digital signal processor (DSP). The movement detector detects movement of the reference surface based on comparisons between images of the reference surface that are captured by the imager. In particular, the movement detector identifies texture or other features in the images and tracks the motion of such features across multiple images. These features may be, for example, inherent to the reference surface, relief patterns embossed on the reference surface, or marking patterns printed on the reference surface. The movement detector identifies common features in sequential images and determines the direction and distance by which the identified common features are shifted or displaced. In some implementations, the movement detector correlates features identified in successive images to compare the positions of the features in successive images to provide information relating to the position of the reference surface relative to the imager. The movement detector translates the displacement information into two-dimensional position coordinates (e.g., X and Y coordinates) that correspond to the movement of the auxiliary input device 26 across the reference surface.

Referring back to FIG. 6, the auxiliary input device 26 also includes a controller 86 and a wireless transmitter 88. The controller 86 delivers the position coordinate information to the wireless transmitter 88 in a format that is suitable for reception by the wireless receiver 76 of the portable computer system 10. The wireless transmitter 86 may be implemented by any one of a wide variety of different wireless transmitters, including an RF transmitter and an IR transmitter.

The auxiliary input device 26 additionally includes a rechargeable power supply 90, a power controller 92, and a docking interface 94. The rechargeable power supply 90 may be any type of battery or other electrical power store that can be recharged by an external power source through the docking interface 94. The power controller 92 controls the supplying of power from the rechargeable power supply 90.

Figure 7:
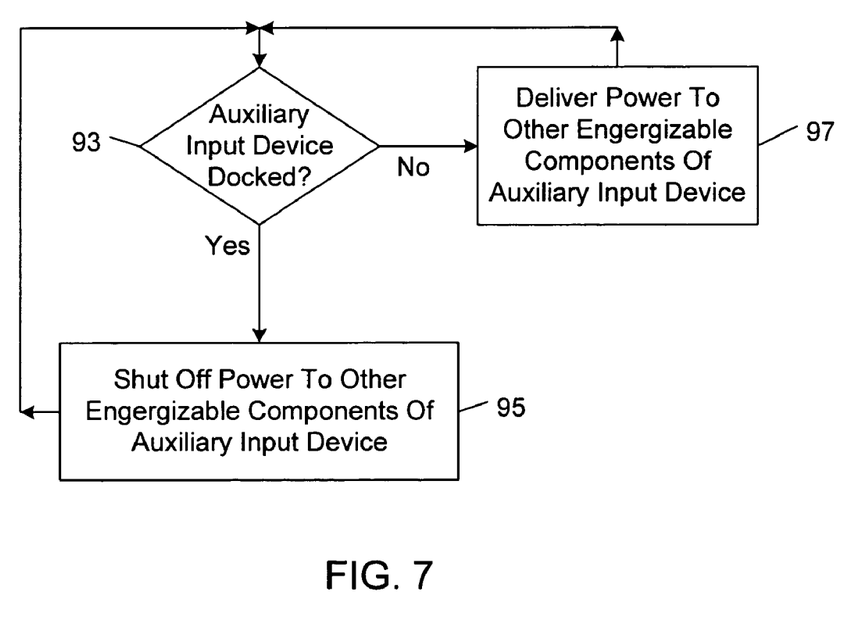
FIG. 7 is a flow diagram of an embodiment of a method of operating the auxiliary input device of FIG. 1.

FIG. 7 shows an embodiment of a method by which the power controller 92 controls the supply of power from the rechargeable power supply 90. The power controller 92 determines if the auxiliary input device 26 is docked in the carrier bay 24 (block 93). The auxiliary input device manager 82 may determine if the auxiliary input device 26 is docked, for example, by detecting whether some or all elements of the electrical connections (e.g., a power supply connection) in the auxiliary input device docking interface 94 have been established between the auxiliary input device and the portable computing system docking interface 64. If the auxiliary input device 26 is docked, the power controller 92 disconnects the rechargeable power supply 90 from all other energizable components of the auxiliary input device 26 (block 95). If the auxiliary input device 26 is not docked, the power controller 92 connects the rechargeable power supply 90 to all other energizable components of the auxiliary input device 26 (block 97).

Figure 8:
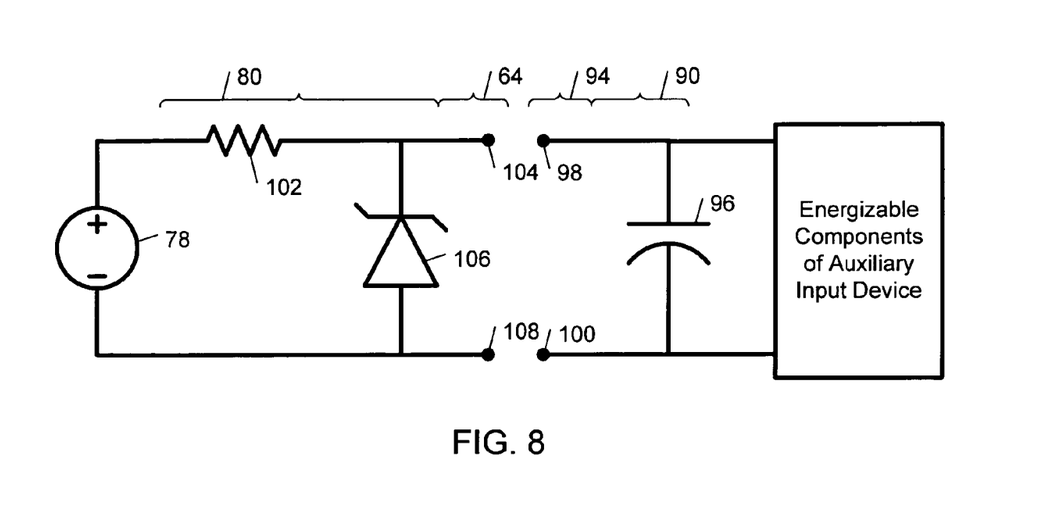
FIG. 8 is a circuit diagram of a rechargeable power supply and a power supply charger in the portable computer system of FIG. 1 and a rechargeable power supply in the auxiliary input device of FIG. 1.

FIG. 8 shows an embodiment of the rechargeable power supply 90 of the auxiliary input device 26 that includes a capacitor 96, which is connected in parallel across two charging terminals 98, 100 of the docking interface 94. The rechargeable power supply 90 may include a charge-limiting zener diode connected across terminals 98, 100 and a current-limiting resistor connected in series between the capacitor 96 and the terminal 98. The rechargeable power supply 90 also may include a voltage regulator between the capacitor 96 and the energizable components of the auxiliary input device 26. In the illustrated embodiment, the power supply charger 80 of the portable computer system 10 includes a resistor 102 that is connected in series with a positive charging terminal 104 of the docking interface 64 and a zener diode 106 that is connected in parallel across positive and negative charging terminals 104, 108 of the docking interface 64. The resistor 102 sets the charging current to a specified charging current range and the zener diode 106 protects the rechargeable power supply 78 of the portable computer system 10 against damage that otherwise might be caused by discharge of the capacitor 96. In other embodiments, the zener diode 106 may be omitted.

Figure 9:
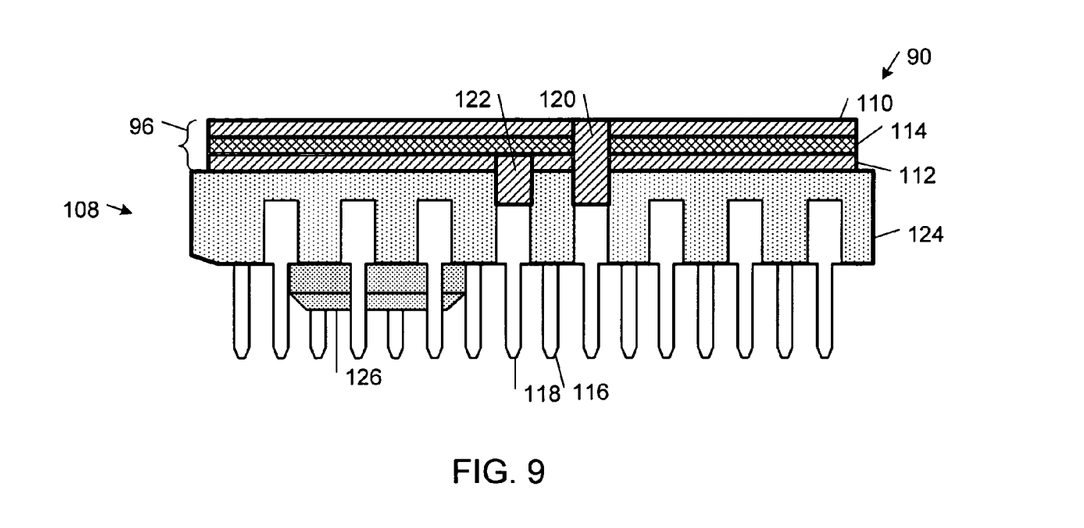
FIG. 9 is a side view of an implementation of a rechargeable power supply that is integrated with a user manipulation sensor in an implementation of the auxiliary input device of FIG. 1.

FIG. 9 shows an embodiment of capacitor 96 that is mounted to a top exterior surface of an optical mouse module 108. The optical mouse module 108 includes a housing 124 that houses the electronic and optoelectronic components of the optical mouse module 108, and a lens assembly 126 that houses the optical components of the optical mouse module 108. In some implementations, the capacitor 96 is implemented by a double layer capacitor in which electrical energy is stored at a charged electrode-electrolyte interface (i.e., the double layer). In this implementation, the capacitor includes a pair of electrodes 110, 112 and a separator 114. The electrodes 110, 112 may be formed of high surface area activated carbons, metal oxide and conducting polymers. The separator 114 is formed of any one of a wide variety of different types of material, including paper, polymer membranes, and glass fibers. In some implementations, the separator 114 is impregnated with an electrolyte. In a typical implementation, the time to fully charge of the capacitor 96 is on the order of about ten seconds and the capacitor can be recharged and discharged virtually any number of times without significant deterioration in performance. In some implementations, the capacitor 96 has a storage capacity that is sufficient to allow the auxiliary input device 26 to operate at least as long as the portable computer system 10 under normal operating conditions with the rechargeable power supply 78 fully charged. The electrodes 110, 112 are electrically connected to respective leads 116, 118 of the optical mouse module 108 by respective electrical conductors 120, 122. The leads of the optical mouse module 108 typically are soldered to an interconnection substrate (e.g., a printed circuit board) contained in the body of the auxiliary input device 26.

Other embodiments are within the scope of the claims.

What is claimed is:

1. An apparatus, comprising:
   a housing;
   a display screen coupled to the housing;
   a main input device operable to translate user manipulations of the main input device into control signals;
   a wireless receiver in the housing;
   a carrier bay defined by the housing, wherein the carrier bay has a docking interface;
   an auxiliary input device sized and arranged to be carried in and attached to the carrier bay in a docked state and detached from the carrier bay in an undocked state, wherein
   the auxiliary input device has a docking interface that mates with the docking interface of the carrier bay when the auxiliary input device is in the docket state,
   in the undocked state, the auxiliary input device translates user manipulations of the auxiliary input device into control signals and wirelessly transmits the control signals for reception by the wireless receiver, and in the docked state, the auxiliary input device is unresponsive to user manipulations of the auxiliary input device;
   a graphics controller in the housing and operable to present a graphical user interface on the display screen in accordance with the control signals received from the main input device and the auxiliary input device; and
   a manager electrically coupled to the docking interface of the carrier bay and operable to detect the auxiliary input device in the docked state, wherein the manager is operable to generate an alarm-triggering control signal when the manager fails to detect the auxiliary input device in the docked state when the apparatus is powered down into one of a sleep mode and a shutdown mode.

2. The apparatus of claim 1, wherein the manager is electrically coupled to the receiver and generates the alarm-triggering control signal in response to signals received from the receiver.

3. The apparatus of claim 2, wherein the manager generates the alarm-triggering control signal when signals received by the wireless receiver from the auxiliary input device are below a threshold power level.

* * * * *